Figure 2:
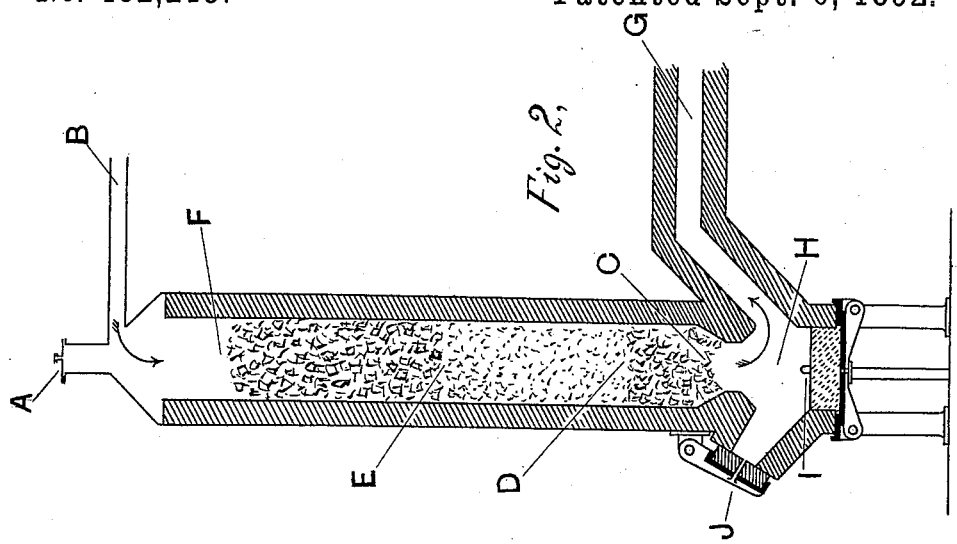

(No Model.)

J. T. WAINWRIGHT.
PROCESS OF REDUCING UNSMELTED ORES.

No. 482,213. Patented Sept. 6, 1892.

Witnesses:
Paul Hillie
J. A. Keable.

Jacob T. Wainwright, Inventor.

UNITED STATES PATENT OFFICE.

JACOB T. WAINWRIGHT, OF CHICAGO, ILLINOIS.

PROCESS OF REDUCING UNSMELTED ORES.

SPECIFICATION forming part of Letters Patent No. 482,213, dated September 6, 1892.

Application filed February 28, 1891. Serial No. 383,188. (No model.)

*To all whom it may concern:*

Be it known that I, JACOB T. WAINWRIGHT, a citizen of the United States, and a resident of Chicago, in Cook county, Illinois, have invented certain new and useful Improvements in Processes of Reducing Unsmelted Ores, including Roasted Ore, Furnace-Cinders, and Like Material, of which the following is a specification.

My invention relates to an improved method of operating a shaft-furnace whereby a more complete separation of impurities from the metal may be effected and the quality of the output caused to be more readily controlled by the operator, and the process is more particularly adapted to the smelting of phosphoric iron ores.

When smelting iron ores, it has been observed that the most desirable way consists in subjecting the ore to the action of the carbonaceous matter and reducing-gases, and it is important to observe that the temperature should not be excessive, but should be maintained at a comparatively low degree for the commencement of the reduction and gradually increase until the process is completed. These conditions are fulfilled in a simple manner in the usual blast-furnace, where the ore gravitates from the coolest part of furnace toward the hottest part.

When smelting iron ores in the usual blast-furnace, it has been observed that the early stages of reduction occur at the upper part of the shaft and that from the sponge-iron there produced a cinder liquates, which is extremely fusible and rich in oxide of iron. It has also been observed that this cinder contains in an unreduced condition nearly all of the phosphorus that was in the ore and that the proportion of phosphorus that is thus separated from the sponge-iron is dependent upon the quantity of unreduced oxide of iron contained in this cinder. On account of the comparatively low temperature maintained in the upper part of the furnace, the cinder is not completely fused until it has gravitated with the charge into the parts below; but during this descent into the hottest part of the furnace it is acted upon by the reducing-gases passing through the shaft, which effect a partial reduction, and thereby reduce not only a portion of the iron therefrom, but also some of the phosphorus. The phosphorus thus reduced alloys with the iron and contaminates the furnace product, and the cinder and iron gravitate into the hearth simultaneously.

In Letters Patent No. 417,691, dated December 17, 1889, I have described a smelting process whereby rich cinder containing the impurities of ore is brought down into the furnace-hearth and conveyed out of the furnace separately from the iron. Although some of the impurities are thereby eliminated, the cleansing process is not thorough, because this rich cinder which is melted and brought down from the upper part of furnace must gravitate through the most reduced portion of of the charge, and thereby contaminate the metal to a certain degree.

One object of my present invention is to eliminate the impurities by means of cinder; but the result is produced in a different manner from that described in the above-mentioned specification.

Another object in view is to reduce the ore and collect the metal in such a way that it may not be contaminated by the cinder. I accomplish this in a shaft-furnace, wherein reducing-gases are caused to take a downward course through ore which has been charged therein, whereby the cinder is caused by gravitation to move in the same direction with these gases.

Referring to Figure 2 of the drawings, a shaft-furnace is shown having at the top an opening for admitting the charge. This opening has a movable cover A, which may be clamped tight when the blast is admitted to the furnace. This furnace is not operated as a continuous process; but intermittent heats are made and the furnace is recharged for each heat. In operating according to my improvements, when commencing with an empty furnace the contracted portion of the shaft (shown at C) is bridged over with an open mass of solid carbonaceous fuel—such as coke, charcoal, or coal—to the height shown at D. On top of this the shaft is charged to the height shown at E with a mixture of ore, flux, and solid carbonaceous fuel in suitable proportions. On top of this ore the shaft is charged to the height shown at F with solid carbonaceous fuel, which may be of a different and cheaper grade than that charged with the ore. A blast of air or other gases that contain free oxygen is then admitted through the blast-pipe B, the top of the fuel ignited, and the cover A put in place and clamped tight to prevent leakage of the blast. The blast-pressure is maintained and the process is now in operation. It may be remarked that the blast may be pre-heated when the nature of the ore under treatment makes it desirable, and also that I have not herein attempted to show the proper proportions of fuel and ore; neither have I mentioned the particular kind of flux to be used, since it may be any of the various kinds that have been used in metallurgical furnaces for treatment of ore or for treatment of metal.

Having thus described the method of putting the process in operation, I will now describe the process. It will be observed that the effect produced by igniting the top of the fuel at F and confining the blast in top part of shaft is to consume this fuel at or near the surface, and the gases resulting therefrom are forced downward through the shaft and out through the gas-flue G, whereby these gases may be utilized for preheating the blast or for other useful purposes. It will also be observed that by consuming the fuel in this manner the gases resulting therefrom increase in temperature and that the final temperature attained is dependent upon the length of the consumed-fuel column. By generating the furnace-gases in this manner the reduction is effected at a gradually-increasing temperature, and thus the most important requirement of a smelting process is met, and also this increasing temperature throughout the shaft prevent scaffolding and congestion.

The effect produced upon the ore by forcing the gases downward through same is to maintain a reducing action and also maintain the upper parts of the ore charge in a hotter and more reduced condition than those below. Consequently when the reducing action reaches that stage when the cinder separates from the sponge metal and gravitates from same this isolation of the metal will progress from the top of the ore charge in a downward direction, whereby the cinder collects in the hearth H without having been in contact with the sponge metal at a high temperature. In this way the impurities of the ore remain in the cinder and do not contaminate the metal. Since there is considerable difference between the melting temperature of the cinder and that of the metal the cinder may be run out of the hearth by means of the tap-hole I before the metal melts in the shaft and collects in the hearth. After the metal collects in the hearth the blast may be maintained for the purpose of raising the temperature there and also for scouring out the shaft. When recharging for a succeeding heat, it may not be necessary to charge fuel into the bottom of the shaft, but the ore may be charged on top of the unconsumed fuel of the previous charge.

The action described relates more particularly to the smelting of ores when the fluxing material has been proportioned to produce a readily-fusible cinder or slag and is applicable to the smelting of phosphoric iron ores. However, the fluxing material may be proportioned to produce a slag having a melting temperature greater than that of the metallic product, in which case the metal will melt first and may be run out of the furnace before the slag melts and is particularly applicable to an efficient smelting of ores containing the more precious metals. Again, the fluxing material may be proportioned to produce a slag having a melting temperature the same as that of the metallic product, in which case the metal and slag gravitate together into the hearth, but the slag will be in a semi-fluid and pasty condition and therefore incapable of contaminating the metal to any great extent. The metal may be run out of the furnace first and the slag allowed to remain until a temperature is attained that will cause it to be sufficiently fluid, whereby it may also be run out, whereas in the usual blast-furnace there is no provision for raising the temperature in the hearth whereby the slag may be run out at a higher temperature than that of the metal.

The furnace-hearth is supplied with the usual tap-holes at different heights, and also an opening with a cover to same, (shown at J.) This opening is convenient for cleaning out and repairing the hearth; also, on account of thus having access to the hearth, carbon or other ingredients may be charged into the molten bath for the purpose of making a definite alloy, or the metal may there be refined by charging it with ore, lime, fluor-spar, or other ingredients that are used for this purpose in the various open-hearth processes; or, if desirable, the metal may be conveyed from this furnace and treated by the pneumatic, open-hearth, or any of the known refining processes.

Figure 1:
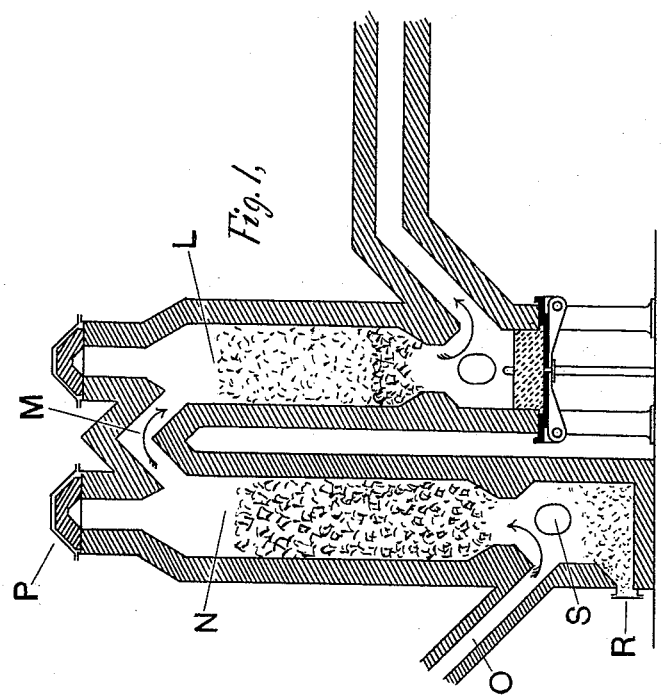

Fig. 1 shows another device for operating my invention, and it is particularly adapted for utilizing cheap solid fuel, whereby this cheap fuel is isolated from the remainder of the furnace charge for the purpose of preventing contamination with the metal and also to keep out of the smelting-furnace the ash resulting from this fuel. A shaft-furnace L, like that shown in Fig. 2, is connected by means of the flue M to the similar shaft-furnace N, wherein this cheap fuel is charged separately for each heat, ignited at the bottom, and blasted by means of the blast-pipe O. The shaft L is charged and operated in a manner like that described for Fig. 2, with the exception that, instead of charging the fuel on the top of the ore charge, this fuel is charged into the shaft N, and the covers P and S are replaced and fastened so as to confine the gases. The ash resulting from the consumption of the fuel in the shaft N collects in the bottom of the shaft and is periodically removed through the opening at R, which is kept closed when the blast is turned on.

Since by this invention any desired temperature may be finally attained in the hearth it may be remarked that steam, water-gas, or other gases containing hydrogen may be mixed with the furnace-gases during the early stages of the process or at any desirable time, and thereby utilized as a refining agent for effecting a more thorough elimination of sulphur and other impurities from the metallic product, and may be effected by any usual method of introducing steam into a furnace-blast.

The inside lining of my furnace may be in part or in whole of such acid, neutral, or basic material as has heretofore been used in constructing metallurgic furnaces; but it may be remarked that furnace-linings are greatly improved by being made thin and properly cooled.

The scope of my invention is not limited to the use of solid fuel, for the furnace-gases may be generated from other sources and adapted to meet the requirements, as hereinafter set forth in the claim.

I am aware that there is nothing new in the use of a shaft-furnace having a downward draft. I am also aware that it is not new to place fuel in a furnace through which an upward blast is passed for the purpose of generating a gaseous product which is to be used in the reduction of ore in an adjacent furnace.

My invention in its broadest scope consists in generating gases at successionally-increasing temperatures and passing these gases downward though unreplenished ore. Thereby I effect an increasing temperature throughout the ore and reduce this ore progressively from the top toward the bottom, whereas heretofore gases thus generated have not been used for smelting purposes by passing same downward through ore which is not kept replenished, and it may be remarked that gases may be thus generated by any of the well-known devices that have been used for this purpose, such as hot-blast stoves and gas-producers, in which the generated gases result from combustion of unreplenished fuel, and, again, gas-producers in which fresh fuel is continuously charged or caused to gravitate into the draft of the gases to replace the consumed fuel, and generate gases successively at a uniform temperature, the fuel and blast remaining the same.

The claim hereinafter set forth is intended to cover my invention in its broadest scope. The examples shown by the drawings and hereinbefore described are different ways of applying the invention that is set forth in this claim.

It is herein understood that a shaft-furnace is one in which a blast is caused to pass through a shaft and permeate the furnace-charge confined therein. This includes the well-known type of furnace wherein the charge is confined in a shaft which is provided with side flues for conveying the furnace-gases across this shaft and through the charge. These furnaces are usually built as an upright shaft having a system of side flues for causing the furnace-gases to cross and recross this shaft at successive heights, and the treatment of ore in a furnace of this description, wherein the furnace-blast is passed through the ore at a certain elevation and caused to repass through the same ore charge at a lower elevation, is herein understood to be an equivalent of passing gases downward through this ore.

It is also understood that any operation herein mentioned in connection with my invention may be performed in any manner that is suitable and known in the present state of the various arts to which the operation under consideration has been applied.

In the claim hereinafter set forth I have described only the essential operations that make up my invention, and I have therein described these operations in as broad and general manner as the present state of the art will permit, and it will be observed that where I have mentioned the application of an operation without describing same in detail and which might seem somewhat vague this specification contains descriptions of two or more different ways of effecting this particular operation as applied to my invention. Consequently in the claim I am obliged to describe such operations in a broad and general way, in order to cover my invention in its broadest sense, and confine the claim to one genus and one of each successive subdivision under this genus.

Having described my invention, what I claim, and desire to secure by Letters Patent, is—

In the art of reducing unsmelted or partly-smelted ore, the improved method of operation, which consists in generating gases at successionally-increasing temperature, passing these gases downward through ore, and maintaining this ore in an unreplenished condition, substantially as set forth.

JACOB T. WAINWRIGHT.

Witnesses:
J. A. REABLE,
PAUL WILLIS.

It is hereby certified that in Letters Patent No. 482,213, granted September 6, 1892, upon the application of Jacob T. Wainwright, of Chicago, Illinois, for an improvement in "Processes of Reducing Unsmelted Ores," errors appear in the printed specification requiring correction as follows: In line 20, page 1, the word "the" after the words "action of" should be stricken out; on page 2, in lines 37–38, the word "prevent" should read *prevents;* on page 3, in line 47, a comma should be inserted after the word "stoves;" in lines 47–48 the comma after the word "gas-producers" should be stricken out; in line 53 the word "and" should be stricken out; after line 61 the following paragraph should be inserted: *It is herein understood that the meaning of the word "unreplenished" is intended to include partial replenishment as an equivalent;* and in line 111 the word "temperature" should read *temperatures;* and that the said Letters Patent should be read with these corrections therein that the same may conform to the papers pertaining to the case in the Patent Office.

Signed, countersigned, and sealed this 11th day of October, A. D. 1892.

[SEAL.]

CYRUS BUSSEY,
*Assistant Secretary of the Interior.*

Countersigned:
W. E. SIMONDS,
*Commissioner of Patents.*